United States Patent
Wainner

(10) Patent No.: US 9,503,370 B2
(45) Date of Patent: Nov. 22, 2016

(54) OPTIMIZED CONTENT ROUTING DISTRIBUTION USING PROXIMITY BASED ON PREDICTIVE CLIENT FLOW TRAJECTORIES

(71) Applicant: Cisco Technology, Inc., San Jose, CA (US)

(72) Inventor: Warren Scott Wainner, Sterling, VA (US)

(73) Assignee: Cisco Technology, Inc., San Jose, CA (US)

( * ) Notice: Subject to any disclaimer, the term of this patent is extended or adjusted under 35 U.S.C. 154(b) by 390 days.

(21) Appl. No.: 14/087,061

(22) Filed: Nov. 22, 2013

(65) Prior Publication Data

US 2015/0146722 A1    May 28, 2015

(51) Int. Cl.
*H04L 12/747* (2013.01)
*H04L 12/733* (2013.01)
*H04L 12/715* (2013.01)

(52) U.S. Cl.
CPC .......... *H04L 45/742* (2013.01); *H04L 45/122* (2013.01); *H04L 45/04* (2013.01)

(58) Field of Classification Search
CPC .... H04L 45/742; H04L 45/122; H04L 45/04
See application file for complete search history.

(56) References Cited

U.S. PATENT DOCUMENTS

| | | | |
|---|---|---|---|
| 7,568,002 B1* | 7/2009 | Vacanti | H04W 4/02 455/414.1 |
| 8,014,318 B2 | 9/2011 | Previdi et al. | |
| 2001/0042110 A1* | 11/2001 | Furusawa | H04L 67/101 709/219 |
| 2003/0079027 A1* | 4/2003 | Slocombe | H04L 29/06 709/229 |
| 2005/0041636 A1* | 2/2005 | Iselt | H04L 45/00 370/351 |
| 2009/0113057 A1* | 4/2009 | Van der Merwe | H04L 29/12349 709/227 |
| 2012/0290724 A1* | 11/2012 | Noro | G06F 17/30887 709/225 |
| 2012/0317307 A1* | 12/2012 | Ravindran | H04L 12/6418 709/238 |
| 2013/0132498 A1 | 5/2013 | Wainner et al. | |
| 2014/0019590 A1* | 1/2014 | Piernot | H04L 67/2823 709/217 |

FOREIGN PATENT DOCUMENTS

EP    2541838 A1    1/2013

OTHER PUBLICATIONS

Seedorf et al.; "Application-Layer Traffic Optimization (ALTO) Problem Statement", Oct. 2009, pp. 1-14, <https://tools.ietf.org/html/rfc5693>.

(Continued)

*Primary Examiner* — Andrew Lai
*Assistant Examiner* — Sumitra Ganguly
(74) *Attorney, Agent, or Firm* — Patterson + Sheridan LLP

(57) ABSTRACT

System, method, and computer program product to perform an operation, the operation comprising capturing, at one or more peering routers, parameters for a plurality of data packets sent by a client device and specifying a destination network address, identifying which peering router captured the parameters for each of the plurality of data packets, determining, based on the identified peering routers, a first peering router nearest to the client, relative to the other peering routers, identifying a first content cache, of a plurality of content caches in a content distribution network, nearest to the first peering router, and fulfilling a content request from the client device using content stored on the first content cache.

21 Claims, 8 Drawing Sheets

(56) References Cited

OTHER PUBLICATIONS

Kiesel et al.; "Application-Layer Traffic Optimization (ALTO) Requirements", Sep. 2012, pp. 1-20, <https://tools.ietf.org/html/rfc6708>.

Varun Khare et al: "Making CDN and ISP Routings Symbiotic", Distributed Computing Systems (icdcs), 2011 31st International Conference on, IEEE, Jun. 20, 2011, pp. 869-878.
International Search Report for PCT/US20141067139, Mar. 30, 2015.

* cited by examiner

100

OPTIMIZED CONTENT ROUTING DISTRIBUTION USING PROXIMITY BASED ON PREDICTIVE CLIENT FLOW TRAJECTORIES

TECHNICAL FIELD

Embodiments presented in this disclosure generally relate to computer networking. More specifically, embodiments disclosed herein optimize content routing distribution using proximity based on predictive client flow trajectories.

BACKGROUND

Content distribution systems often rely on at least one of two location methods to determine an optimal point of content delivery—geo-location proximity and network proximity from the perspective of the content distributor. In geo-location proximity, an analytics system may identify a client's location with a latitude/longitude or the physical location of the client's network attachment. Third party systems provide services that correlate IP addresses with geographic locations. Geo-location information, however, frequently does not correlate with a proximity of the client to a potential content distribution point. That is, geographic location is often a poor proxy for making network delivery decisions. If no network connection is available between the client and the 'best' content distribution point based on geo-location, then the content flow is sub-optimal. For example, content transmitted to the geographic location may end up leaving the area to find a peering point and then returning to the same general location in order to reach a client.

In systems implementing network proximity (from the perspective of the content distributor) the content distributor may assess the client's IP address relative to delivery nodes in the operator's network routing topology and determine what appears to be the shortest topological path from any of the content distribution nodes to the client. However, the shortest topological path is typically limited to the perspective of the content distributor. Such a perspective may be biased as asymmetric routing is common in the Internet where "nearest exit routing" is the method of operation.

The best path from the perspective of the client is the path taken to reach the nearest content distribution node—however, the client does not know the location of these nodes. The number of delivery nodes is likely to be large and encumbering the client with polling hundreds of nodes to assess which is the most responsive is often intractable. Fundamentally, the closest topological delivery node can only be determined by routing a packet from the client to all the potential delivery nodes and assessing their relative topological proximity. This process is onerous given the number of delivery nodes and clients.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Figure 1A:
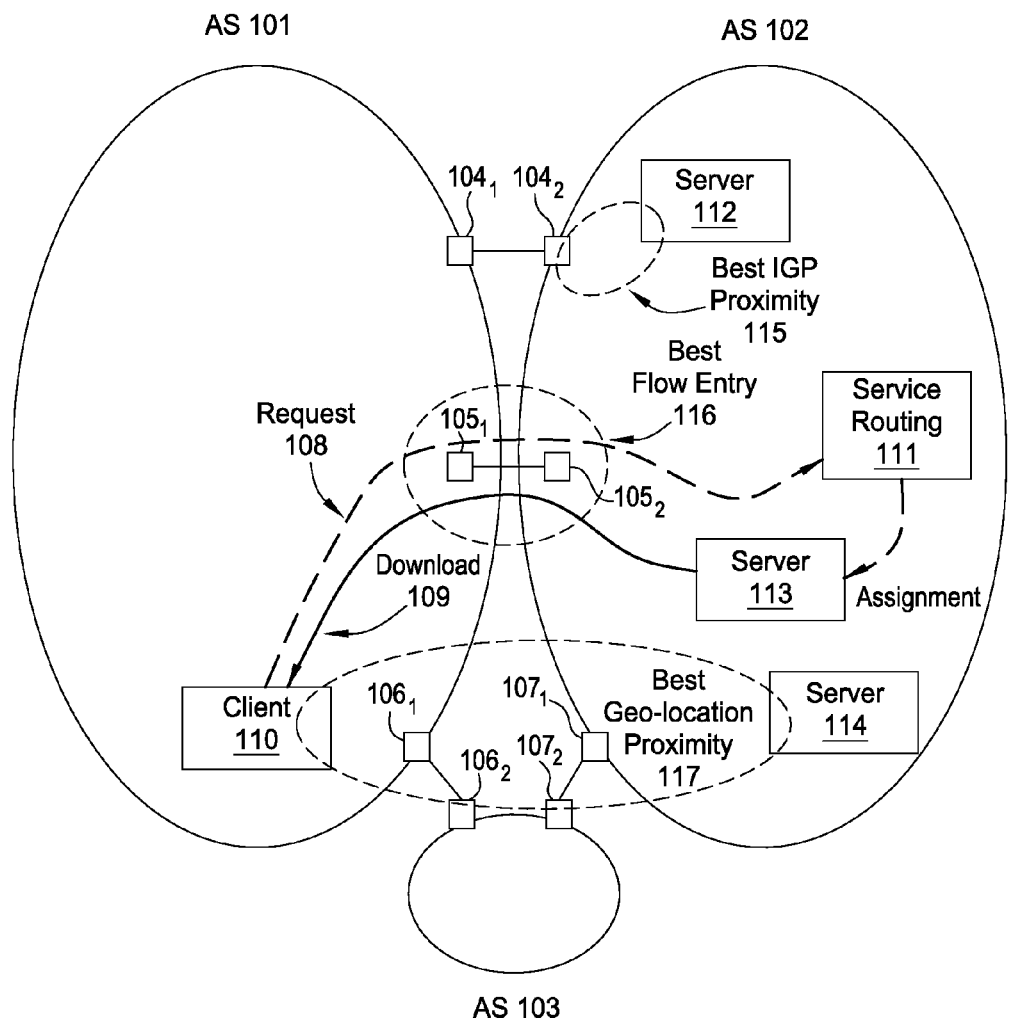
FIGS. 1A-1D illustrate techniques to optimize content routing distribution using proximity based on predictive client flow trajectories, according to one embodiment.

One embodiment disclosed herein provides a method which includes capturing, at one or more peering routers, parameters for a plurality of data packets sent by a client device and specifying a destination network address. This method may also include identifying which peering router captured the parameters for each of the plurality of data packets and determining, based on the identified peering routers, a first peering router nearest to the client, relative to the other peering routers. This method may also include identifying a first content cache, of a plurality of content caches in a content distribution network, nearest to the first peering router and fulfilling a content request from the client device using content stored on the first content cache.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

Example Embodiments

Embodiments disclosed herein provide techniques to deliver content from a content distribution network to a client using a routing path that is optimized topologically from the perspective of both the network operator and the client. The content routing systems disclosed herein predict a client's trajectory for traffic entering the content operator's network, and use the predicted trajectory as a filter specification to rank and order potential egress peering points based on their proximity to the client. The content routing system may then correlate knowledge of content caches with the proximity of each potential egress peering point. The content routing system may then identify the optimal content cache system from the perspective of the network-to-client flow trajectory and the predictive client-to-network flow trajectory. Once identified, the optimal content cache may be used to serve requested content to the client device.

Stated differently, embodiments disclosed herein select an appropriate content cache system based on a predicted preferred ingress point into the content distribution network for a given client device. A service routing engine predicts the client device's preferred ingress point by collecting flow parameters regarding data packets from the client device that have a content server domain name system (DNS) server as a destination. These packets may be forwarded by peering routers on the edge of the content provider's network where parameters are captured regarding the flows. The service routing engine may index the parameters to provide nearreal time information on the peering routers that the client device uses to enter the content distribution network. The service routing engine may then rank each peering router based on the frequency of which the client device used to enter the content distribution network (CDN). For example, packets destined for a content portal may enter the CDN through peering router 1 20% of the time, through peering router 2 20% of the time, and through peering router 3 60% of the time. Based on these relative frequencies, the service routing engine would determine that peering router 3 is the closest peering point to the client device, as the entry point was most frequently selected by the client device (and its Internet Service Provider) as a point of entry. The service routing engine may then identify content cache servers nearest to the closest peering router (or several peering routers) based on one or more routing protocols. The service routing engine may then fulfill content requests from the client device using the identified content cache server.

FIG. 1A is a block diagram illustrating a computing infrastructure 100 for routing content based on predictive client flow trajectories, according to one embodiment. As shown, a client device 110 issues a request 108 to a service routing engine 111. The client device 110 is a member of autonomous system (AS) 101, while the service routing engine 111 is a member of AS 102. AS 101 and AS 102 are also connected via AS 103. As shown, AS 102 includes three servers 112-114. In one embodiment, AS 102 is a content distribution network (CDN), and the servers 112-114 are content caches situated in different geographic locations. Peering points $104\text{-}107_{1\text{-}2}$ represent points of ingress and egress between the autonomous systems 101-103. Although depicted as separate points, a single peering router may provide the points of ingress and egress. When the service routing engine 111 receives the request 108 from the client 110, the service routing engine 111 may select which server 112-114 should fulfill the request.

The service routing engine 111 may perform a variety of algorithms to select which server 112-114 to fulfill requests received from the client 110. For example, interior gateway protocol (IGP) 115 may be used. Using IGP 115, the service routing engine 111 selects the shortest topological path from a server 112-114 to the client 110. For example, a request fulfilled by server 112 to the client 110 would travel through peering point $104_{1\text{-}2}$, as this peering point provides the best IGP proximity to AS 101 relative to the servers 113-114. However, the distance between peering router $104_1$ and the client 110 may be great (from a geo-location and/or routing perspective) and result in a time for download 109 that is longer than using what would be a "longer" path from perspective of a different peering router. The service routing engine 111 could instead use a geo-location proximity measure to fulfill the client requests. To do so the routing engine 111 uses the geographic distance between the servers 112-114 relative to the client 110. For example, the service routing engine 111 could determine that server 114 is the closest geographical server to the client 110 and, as a result, fulfill the client request 108 through peering router $107_{1\text{-}2}$. However, this results in the content being passed through the AS 103, which could unnecessarily slow the download 109 of content to the client 110.

Advantageously, embodiments disclosed herein blend geo-location and network proximity to identify a best flow 116 to fulfill the client request 108. As shown, the service routing engine 111 causes server 113 to send download 109 to the client 110 through peering points $105_{1\text{-}2}$. The service routing engine 111 may determine that peering points $105_{1\text{-}2}$ are closest to the client 110 by referencing an index of data packets sent by the client 110 and collected by the peering points 104-107. For example, where the AS 102 is a content distribution network, data packets destined for a content portal or a content DNS system are captured. The service routing engine 111 may identify the peering router 104-107 used most frequently by client 119 to enter the AS 102 and predict that this peering router is in nearest proximity to the client 110. For example the service routing engine 111 determines that packets from client 110 entered AS 102 through peering router $105_{1\text{-}2}$ with the greatest frequency. The service routing engine 111 may then identify that server 113 is nearest to the peering router $105_{1\text{-}2}$, and that server 113 is therefore the best server to fulfill the download request. The service routing engine 111 may determine that the server 113 is nearest to the peering router $105_{1\text{-}2}$ based on any feasible method, including to routing distance (using protocols such as IGP, BGP, etc), physical proximity, or static mappings.

Figure 1B:
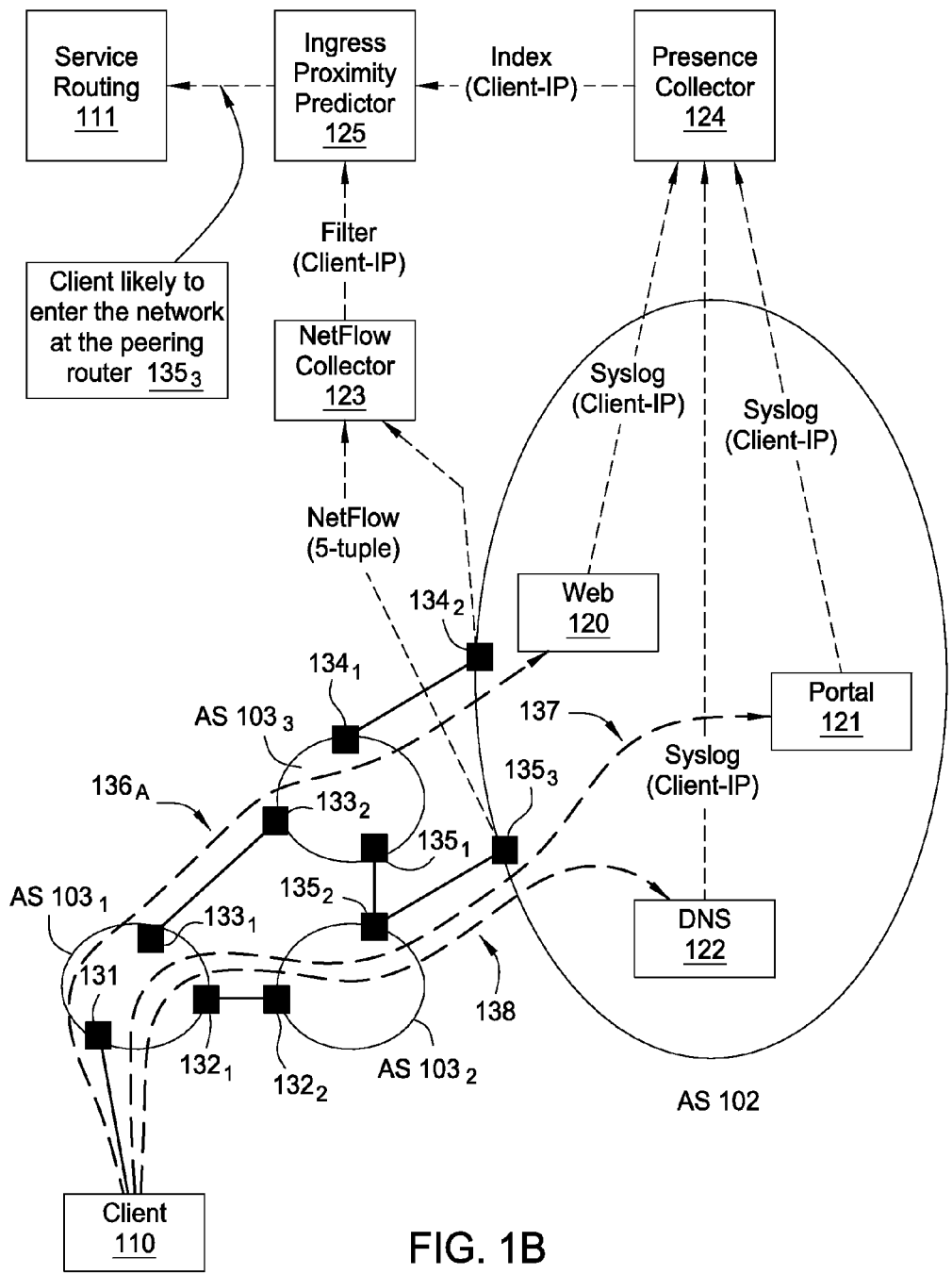

FIG. 1B illustrates a logical view 100 of a system to predict trajectory for client initiated connections, according to one embodiment. As shown, the client 110 is connected to an autonomous system (AS) 102 through AS $103_{1\text{-}3}$. The client 110 accesses AS $103_1$ through a peering router 131. Each AS 102, 103 is connected through peering routers 132-136. The AS 102 includes a web server 120, a content portal 121, and a DNS system 122. The client 110 may issue a request 136 for the web server 120, a request 137 for the content portal 121, and a request 138 for the DNS 122.

Peering routers $134_2$ and $135_3$ are configured to log parameters regarding packets forwarded for the client 110 (and other clients) to an analytics system, such as the netflow collector 123. In one embodiment, the content portal 121 and DNS system 122 are part of a content delivery network which clients connect to and authenticate with the content portal 121. In doing so, the clients send packets to the portal using a shortest IP path, determined relative to the clients' perspective. The portal may be a well-known target that is recognized by a fully qualified domain name (FQDN). The FQDN of the portal 121 is associated with one or more IP addresses. The client 110 may resolve the FQDN to one of the IP addresses using the DNS system 122 and initiate a connection to one of these target IP addresses. For the client 110, the autonomous systems (networks) 103 may route the packet on the shortest path using nearest exit routing. These target IP addresses may represent a filter specification for the netflow collector 123. The netflow collector 123 may be configured to capture a 5-tuple 117 of internet protocol (IP) parameters from packets, including, e.g., a source IP address, a destination IP address, a protocol, a source port, and a destination port. A subset of these packets may be TCP SYN packets that correlate to a client opening a connection, thereby reducing the logging requirements. The netflow collector 123, may, therefore, identify flows of interest from data packets having a destination IP address in the netflow 5-tuple correlating to one of the portal IP addresses defined in the filter specification. Parameters for packets not meeting these specifications may be disregarded, such as the packets related to request 136, as the request 136 was directed to the web server 120.

The filtered results 118 (including a client IP address and the incoming peering routers collecting the packets) may be cached and analyzed by an ingress proximity predictor 125, which predicts a nearest point of entry (i.e., peering router $134_2$ or peering router $135_3$) to the client 110. A presence collector 124 may receive system logs including the IP addresses 119 of the client devices that access the resources in the AS 102, and provide this data to the ingress proximity predictor. The ingress proximity predictor 125 may analyze the data packets sent by the client 110 in requests 137-138, i.e., requests meeting the filter specifications. In doing so, the ingress proximity predictor 125 may determine both requests 137-138 entered AS 102 through peering router 135$_3$, while no requests entered through peering router 134$_2$. Based on this determination, the ingress proximity predictor 125 may determine that client 110 is likely to enter the network at peering router 135$_3$. It may follow that peering router 135$_3$ is the nearest to the client 110. This information may be provided to the service routing engine 111, and used by the service routing engine 111 to identify the content cache nearest to the peering router 135$_3$.

Figure 1C:
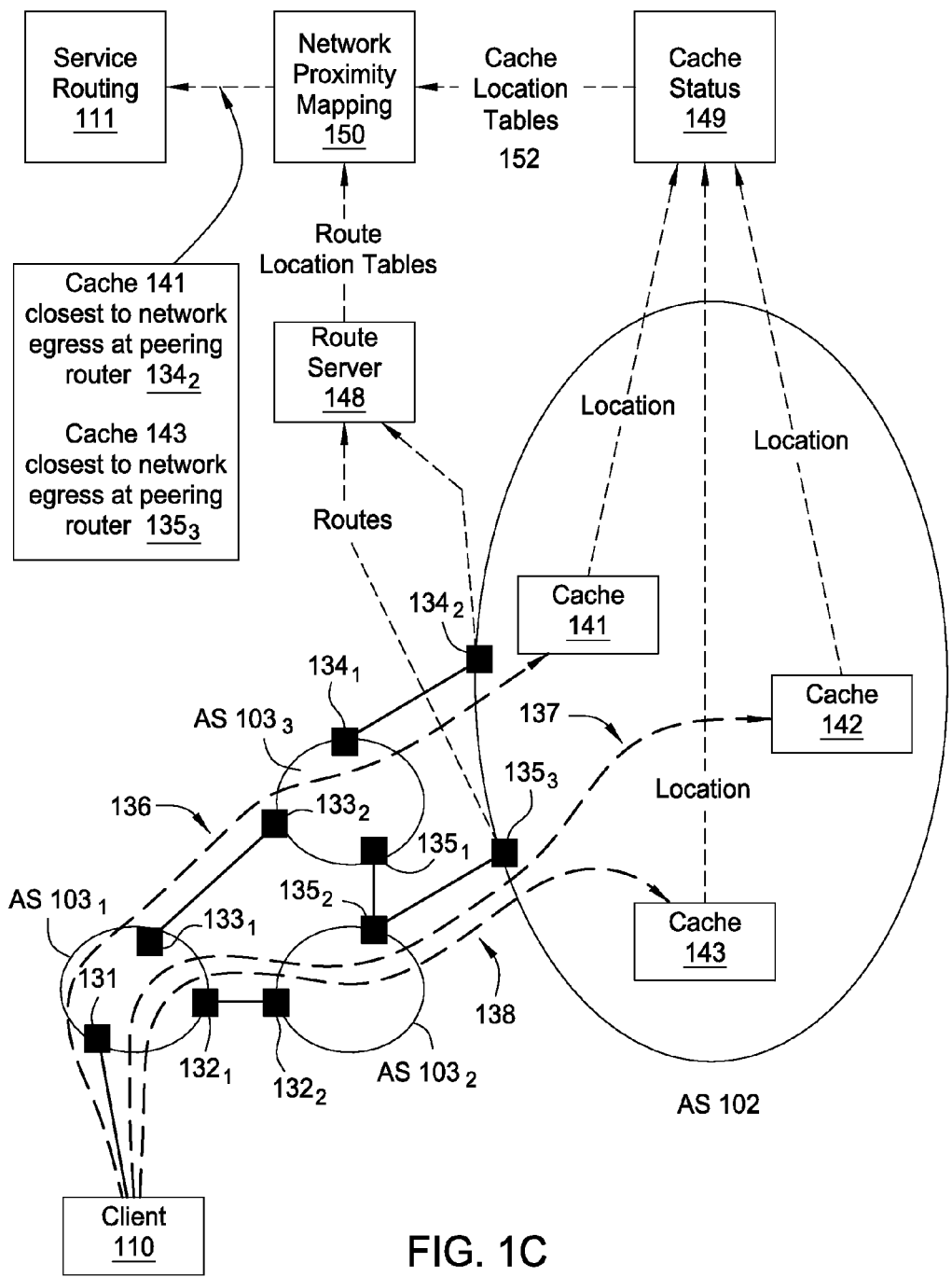

FIG. 1C illustrates a logical view 100 of a system to evaluate candidate cache systems, according to one embodiment. As in FIG. 1B, client 110 accesses the AS 102 through one or more of AS 103$_{1-3}$. As shown, three content caches 141-143 report their locations to a cache status 149, which holds location information for each content cache in the AS 102. The peering routers 134$_2$ and 135$_3$ provide route information to one or more route servers 148. The route servers 148 provide routing topology information, which may include IGP hop count or BGP AS path information. Each cache 141-143 may be assigned a unique IP address, therefore the route servers 148 can calculate the path from each peering router to any given cache. Given the fact that routing is a dynamic process based on the state of the links within an autonomous system, the route server can determine the shortest path from each peering point to any given cache. A network proximity mapping engine 150 uses cache location tables provided by the cache status 149 and route location tables provided by the route server 148 in order to determine which of the content caches 141-143 are nearest to the peering router identified as the nearest to the client 110. As discussed above, the peering router 135$_3$ may have been identified as the nearest to the client 110. Therefore, the network proximity mapping engine 150 may determine which cache is closest to the peering router 135$_3$, and prioritize to the service routing 111 the fact that content cache 143 is the best location to serve the content request made by client 110.

To determine which content cache is "nearest" to the client's predicted entry point, the network proximity mapping engine 150 may use any metric, including geographic distance, geo-location proximity, network proximity (such as number of hops, latency, etc), or a predefined static mapping between caches and a peering router. As shown, the network proximity mapping 150 may determine that that cache 141 is closest to network egress at peering router 134$_2$, while cache 143 is closest to network egress at peering router 135$_3$. The network proximity mapping 150 may provide this information to the service routing 111, allowing the service routing engine 111 to select a content cache to deliver content to the client 110 based on both physical proximity and network proximity.

Figure 1D:
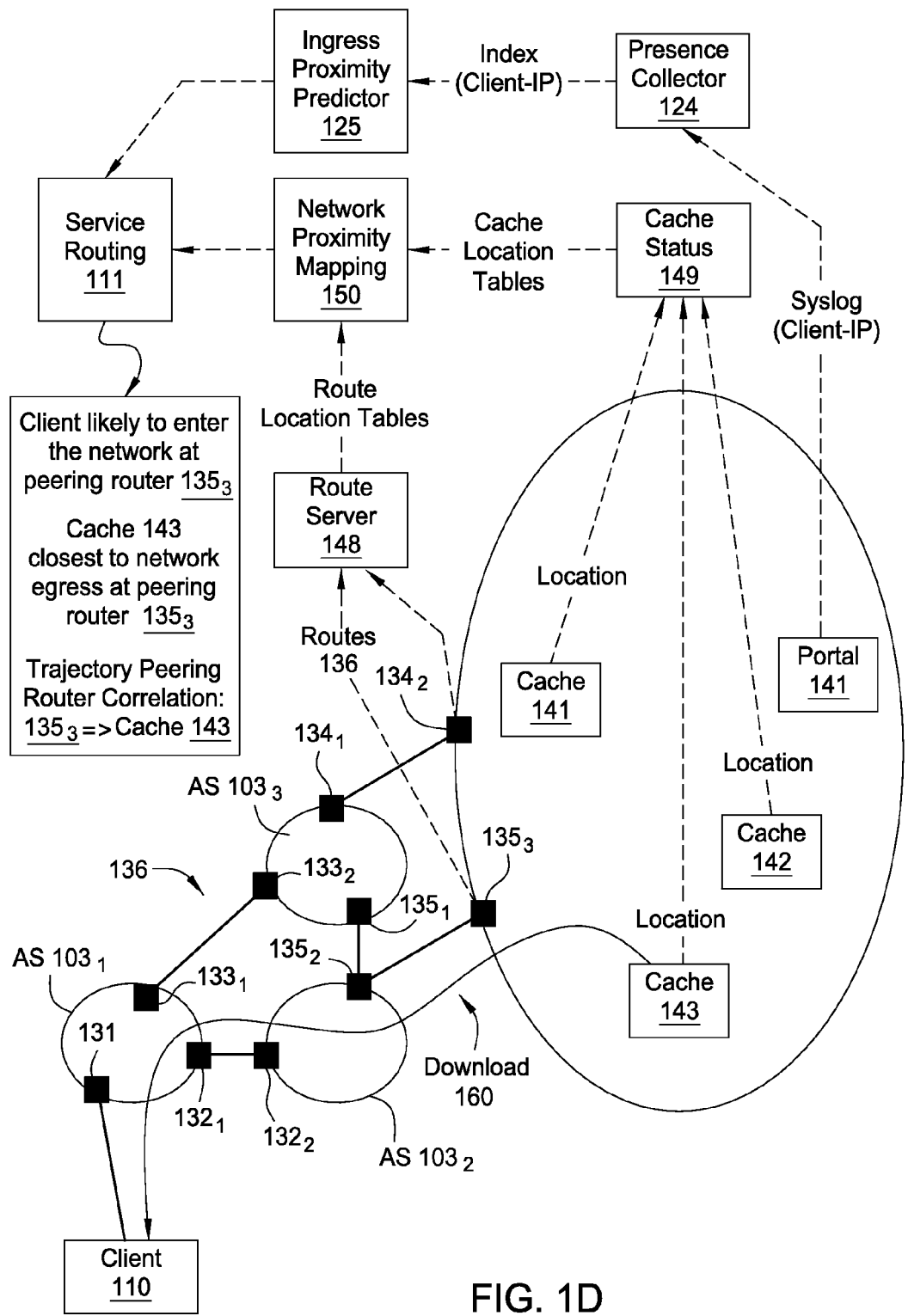

FIG. 1D illustrates a logical view 100 of a system using trajectory correlation for optimal cache system selection, according to one embodiment. Generally, FIG. 1D shows a combination of the systems in FIGS. 1B and 1C, which allows the service routing engine 111 of the content distribution network to identify the nearest network entry point from the client 110's perspective and determine which content cache is nearest to this network entry point. As shown, the service routing engine 111, using the inputs from the ingress proximity predictor 125 and the network proximity mapping engine 150, determines that the client 110 is most likely to enter the network at peering router 135$_3$, as both requests directed at the portal 121 and the DNS 122 are received through peering router 135$_3$. The service routing engine 111 may then determine that cache 143 is the closest to network egress at the peering router 135$_3$. The trajectory correlation determined by the service routing engine 111 is therefore that peering router 135$_3$ correlates to cache 143. As such, the service routing engine 111 may instruct the content cache 143 to initiate the download 160 of content to the client 110 through peering router 135$_3$. Advantageously, the content is delivered using a content cache nearest to the egress point of peering router 135$_3$, which is also the nearest peering point for the client 110.

Figure 2:
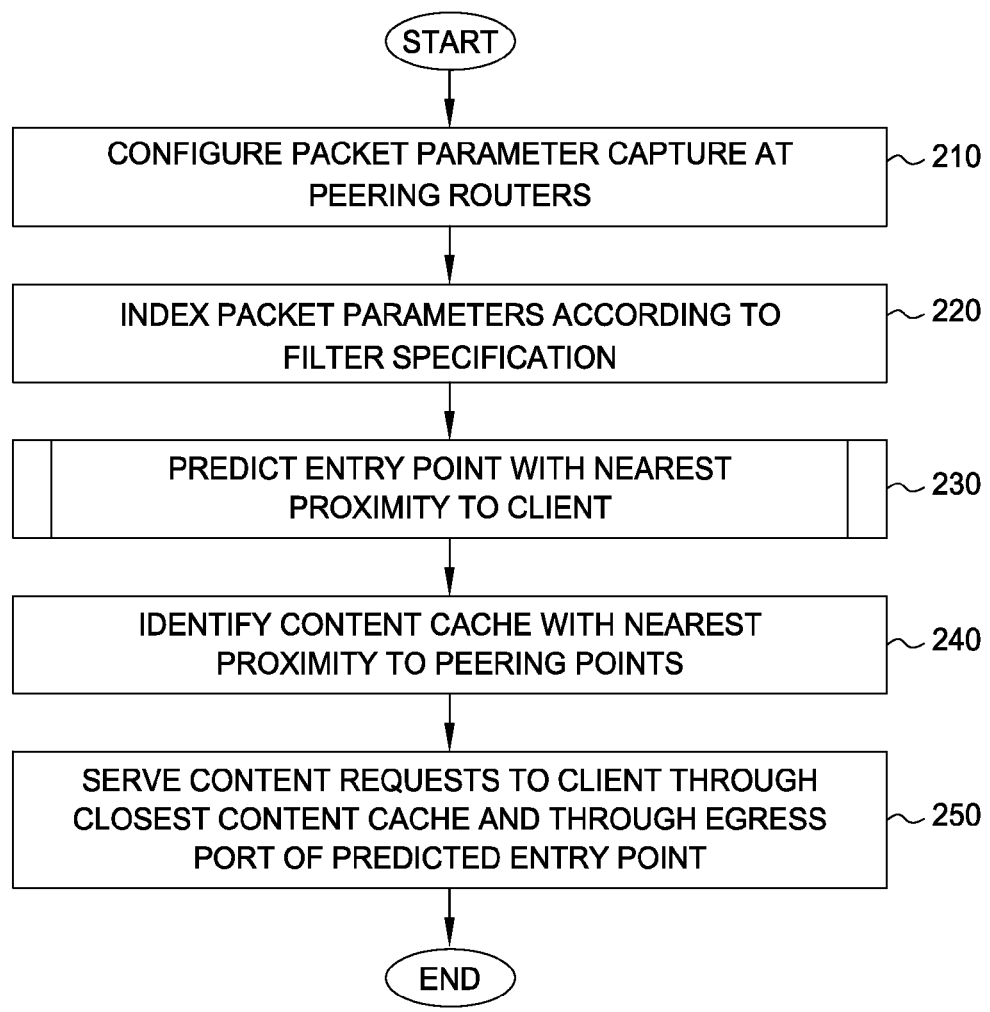
FIG. 2 illustrates a method to optimize content routing distribution using proximity based on predictive client flow trajectories, according to one embodiment.

FIG. 2 illustrates a method 200 to optimize content routing distribution using proximity based on predictive client flow trajectories, according to one embodiment. Generally, a content distribution system may execute the method 200 to predict a client device's nearest entry point into the content distribution network and select a content cache nearest to the client's nearest entry point. At block 210, a user or the system configures a packet capture at one or more peering routers in the content distribution network. The peering routers provide points of ingress and egress to the content distribution network. The packet capture module may have a filter specification that specifies to index packets having a source IP address from a client and a destination address matching one or more IP addresses assigned to content portals and content cache DNS systems.

At block 220, the system indexes packets according to the filter specification, creating a database of "flows of interest," i.e., packets sent from a client (identified by their IP address) to the content portals or content cache DNS systems. The database may also include identification information for the peering routers that collected parameters for each respective packet forwarded. Generally, an analytics system collecting the packet parameters may accumulate millions of flows, making real-time analysis difficult. However, by defining a filter specification of candidate flows that are of particular interest, namely those connecting to the content portal and DNS system, a much smaller subset of flows can be identified. The filter specification therefore allows a majority of the flows to be ignored or discarded, while recording the flows of interest because there is a high likelihood that a client connecting to a content portal will be making a content request, and need a content distribution node assigned.

At block 230, described in greater detail with reference to FIG. 3, the system predicts the entry point into the content distribution network that has the closest proximity to the client. The proximity may be geographical or network-based. Generally, at block 230, the system ranks (or scores) each entry point (peering router) based on its likelihood that it is in closest proximity to the client. The ranking may be based on a frequency with which the client's packets enter the network at these peering points. The system may then predict that the peering router that received the most packets from the client is nearest to the client device. For example, peering routers 1, 2, and 3, may capture the following parameters for packets from a client device:

Peering router 1=>Web server IP address (Destination IP3)
Peering router 2=>PING IP (Destination IP4)
Peering router 3=>Portal IP (Destination IP1)
Peering router 3=>Content DNS IP (Destination IP2)
Peering router 3=>Web DNS IP (Destination IP5)

As shown, the peering routers collected parameters for five packets (or multiple packets for each respective request) from the client having five different destinations, IP1-IP5. However, the filter specification may only indicate that destination IP1 and IP2 are relevant, as they are related to the content portal and content DNS, respectively. The inverse path is the path of interest from the perspective of the content distribution system. However, this path may not be the same as "nearest exit routing" from the perspective of the operator's network. Every cache system deployed in the content distribution system may have a different perspective of the "nearest exit routing" path and that path may not be congruent with the incoming path chosen by the client. The goal is therefore to find a cache system where the "nearest exit path" is congruent with the client's chosen ingress path to the network.

The client may connect to many different systems. Therefore, a set of entry paths may highlight the likely entry point into the network. The entry points may be rank-ordered and weighted to show the probability of a given peering point being closest to the client. Continuing with the example above, at block 230, the content distribution system may reorder the peering routers as follows:

Peering router 3=>Portal IP (Destination IP1)
Peering router 3=>Content DNS IP (Destination IP2)
Peering router 3=>Web DNS IP (Destination IP5)
Peering router 1=>Web server IP address (Destination IP3)
Peering router 2=>PING IP (Destination IP4)

As shown, peering router 3, and destinations IP1 and IP2 are weighted higher due to the association of the IP addresses to the content delivery services. The frequency of the client entering the network at peering router 3 causes a rank ordering of the candidate peering routers.

At block 240, the system may identify the content caches closest to the peering points. Generally, content distribution systems have content cache systems distributed throughout the network. These caches may have different proximity to each of the network egress peering points. The role of a content routing system is to determine the closest cache to any given network egress point. The proximity information may be based on network distance, geographical distance, or any other metric. A static mapping may also be provided between caches and peering points. For example, content caches 1, 2, and 3 may be ordered in proximity to peering routers 1, 2, and 3 as follows:

Cache 1=>peering router 2, peering router 1, peering router 3
Cache 2=>peering router 1, peering router 2, peering router 3
Cache 3=>peering router 3, peering router 1, peering router 2

Therefore, in this example, cache 1 is nearest to peering router 2, cache 2 is nearest to peering router 1, and cache 3 is nearest to peering router 3. The closest cache may be indexed according to each peering point. At block 250, the content routing system may use shortest path determined at block 230 (client to ingress peer) in conjunction with the best network proximity path determined at block 240 (cache node to egress peer), to serve content requests to the client by a content cache in nearest proximity to the ingress point closest to the client. If, for example, peering router 3 is the nearest point of ingress for the client, then at block 250, the system may select content cache 3 to serve content requests to the client through peering router 3.

Figure 3:
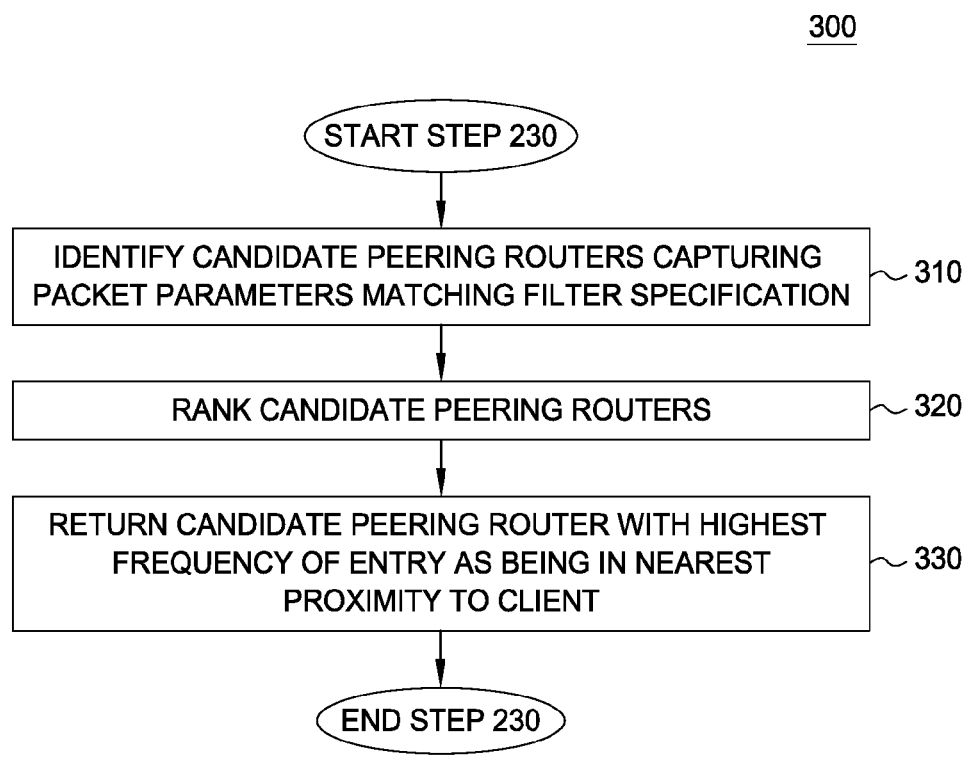
FIG. 3 illustrates a method to predict trajectories for client initiated connections, according to one embodiment.

FIG. 3 illustrates a method 300 corresponding to block 230 to predict trajectories for client initiated connections, according to one embodiment. Generally, a content routing system may implement the method 300 to predict a point of ingress (of many points of ingress) nearest to a client device. At block 310, the content routing system identifies candidate peering routers capturing packet parameters matching the filter specification for a given client. In one embodiment, the peering routers are identified in a database indexing parameters for data packets from the client along with the peering router that forwarded each packet. At block 320, the candidate peering routers are ranked, e.g., based on a frequency that the client entered the network through a particular peering router and whether that candidate peering router received packets having a destination of one or more IP addresses of interest. At block 330, the content routing system returns a candidate peering router having the highest rate of entry as being in nearest proximity to the client.

Figure 4:
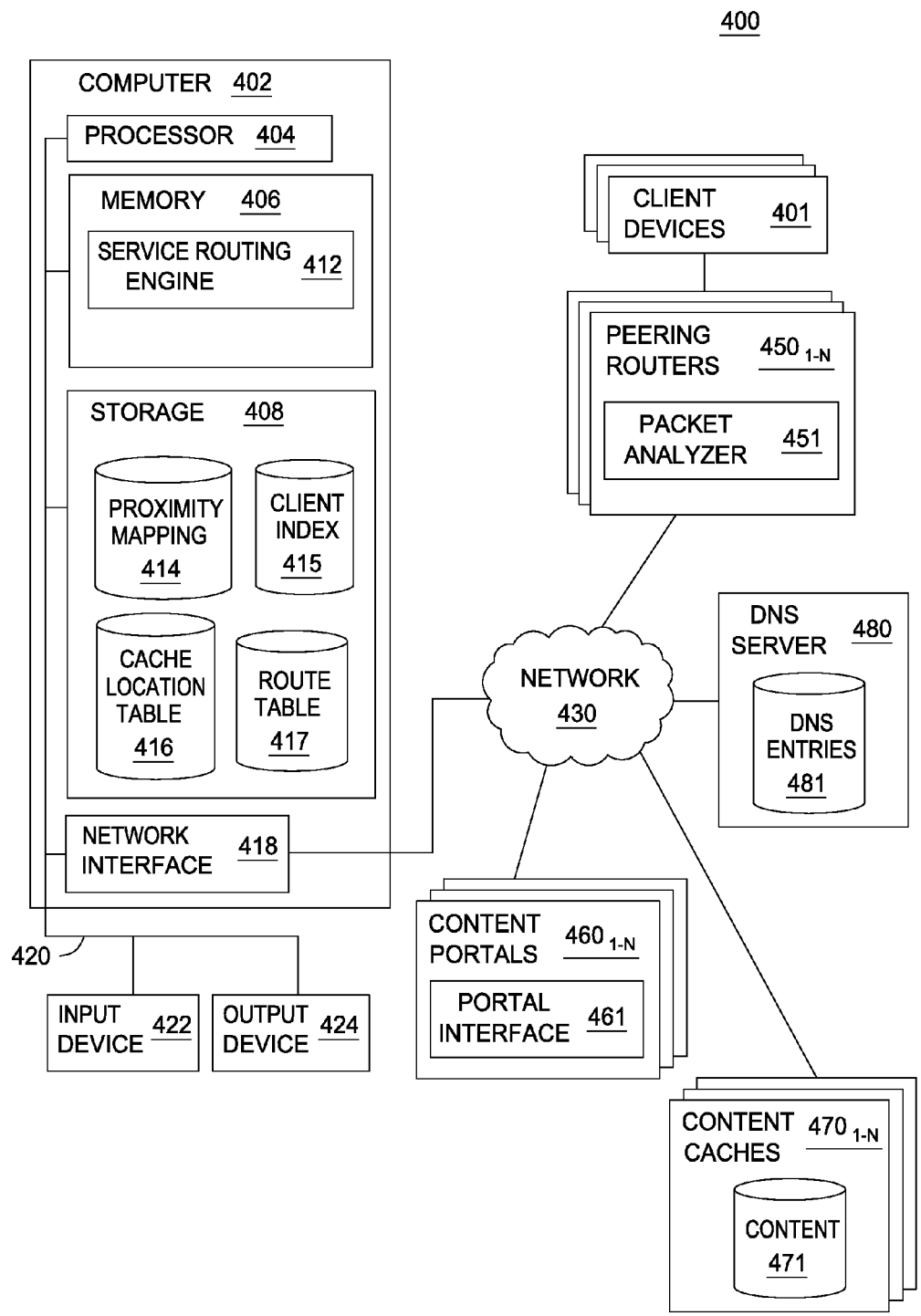
FIG. 4 illustrates a system to optimize content routing distribution using proximity based on predictive client flow trajectories, according to one embodiment.

FIG. 4 illustrates a system 400 to optimize content routing distribution using proximity based on predictive client flow trajectories, according to one embodiment. In one embodiment, the system 400 is a content distribution system. As shown, computer 402 is connected via a network 430 to other devices, such as peering routers $450_{1-N}$, content portals $460_{1-N}$, content caches $470_{1-N}$, and one or more DNS servers 480. In one embodiment, the computer 402 comprises one or more communication devices such as switches and routers. In general, the network 430 may be a telecommunications network and/or a wide area network (WAN). In a particular embodiment, the network 430 is the Internet.

The computer 402 has a processor 404 connected via a bus 420 to a memory 406, and a network interface device 418. The computer 402 is configured to execute containerized software applications. The computer 402 is generally under the control of an operating system (not shown). Examples of operating systems include the UNIX® operating system, distributions of the Linux® operating system, and the IOS operating system by Cisco Systems®. The processor 404 is included to be representative of a single CPU, multiple CPUs, a single CPU having multiple processing cores, and the like. The processor 404 may execute software developed for the purposes of embodiments disclosed herein. Similarly, the memory 406 may be a random access memory. While the memory 406 is shown as a single identity, it should be understood that the memory 406 may comprise a plurality of modules, and that the memory 406 may exist at multiple levels, from high speed registers and caches to lower speed but larger DRAM chips. The network interface device 418 may be any type of network communications device allowing the computer 402 to communicate with other devices via the network 430.

As shown, the memory 406 includes a service routing engine 412, which is an application generally configured to determine a peering router $450_{1-N}$ that is closest to a client device accessing one or more resources in the system 400. The service routing engine 412 may determine the closest peering router by identifying the peering router that a client device 401 uses most frequently to access the resources in the system 400. The service routing engine 412 is further configured to find a content cache $470_{1-N}$ that is nearest to the peering router determined to be closest to the client device 401. Once the service routing engine 412 makes these determinations, it directs one of the content caches $470_{1-N}$ to fulfill a content request to the client device 401 though the identified peering router $450_{1-N}$.

As shown, the storage 408 includes a proximity mapping 414, a client index 415, a cache location table 416, and a route table 417. The proximity mapping 417 includes one or more mappings indicating the proximity of a given content portal $460_{1-N}$ to each of the peering routers $450_{1-N}$. The mappings may be based on physical distance, network-based distance (by one or more routing protocols), or may be statically defined by a user, or the service routing engine 412. The service routing engine, or a designated component thereof, may receive updates from devices in the network 430, and update the proximity mapping 414 accordingly. The client index 415 is a database of relevant packet parameters captured by the packet analyzer 451 of the peering routers $450_{1-N}$. The client index 415 stores parameters regarding packets sent by one or more client devices to the DNS server 480 or the content portals $460_{1-N}$. The records in the client index 415 include at least a client identifier, a destination identifier, and the peering router $450_{1-N}$ that captured the packet. The cache location table 416 indicates a physical location of each of the content caches $470_{1-N}$, and may be updated through location data sent by the content caches $470_{1-N}$ to the service routing engine 412. The route table 417 includes routing data for the network, and specifies network distances, geographical distances, and other routing information on how to transmit packets throughout the network 430.

The peering routers $450_{1-N}$ serve as points of ingress and egress into the network 430, and each may be located in different geographical locations. The peering routers $450_{1-N}$ include a packet analyzer 451 which collects packet flow parameters from the client devices 401, and transmits the flow information to the service routing engine 412, where the service routing engine 412 indexes the flows into the client index 415. The client devices 401 connect to the peering routers $450_{1-N}$ through one or more other networks (not pictured). The DNS server 480 stores DNS entries 481, which are IP representations of each of the resources in the network 430. A client device 401 may access the DNS server 480 in order to resolve a fully qualified domain name to an IP address of a resource in the network 430, such as the content portals 460 or the content caches 470. The content portals $460_{1-N}$ provide a portal interface 461 that allows client devices 401 to browse content stored 471 stored in the content caches $470_{1-N}$. For example, the client device 401 may browse through a collection of movies through the portal interface 461, and select a movie to watch or save for later viewing. The content caches $470_{1-N}$ store a plurality of items of content 471. Each of the content caches $470_{1-N}$ may be in different geographic locations.

Figure 5:
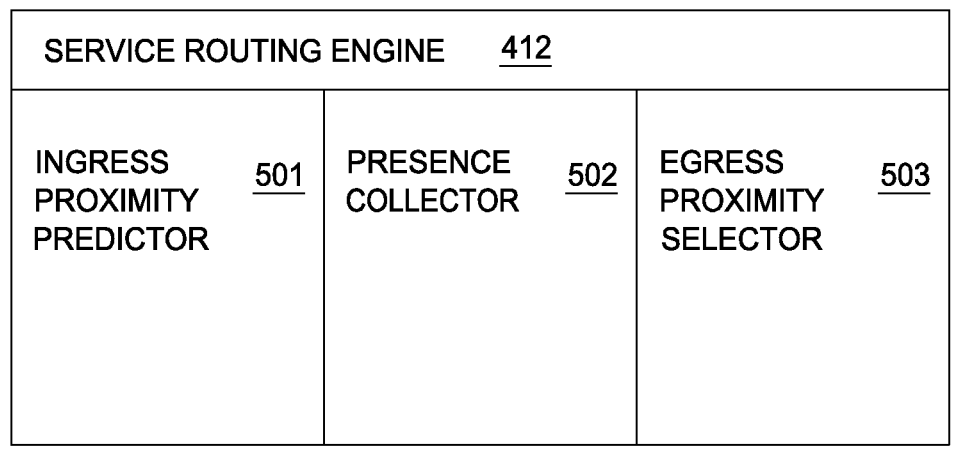
FIG. 5 illustrates components of a service routing engine, according to one embodiment.

FIG. 5 is a schematic 500 illustrating components of the service routing engine 412, according to one embodiment. As shown, the service routing engine 412 includes an ingress proximity predictor 501, a presence collector 502, and an egress proximity selector 503. The ingress proximity predictor 501 may access data parameters regarding packets in the client index 415 sent from one or more client devices in the network. The packets may be limited to a subset of packets sent by one (or more) client devices targeting the content portal 460 or the content DNS server 480. The packets indicate which peering router $450_{1-N}$ collected the packet flow parameters. Based on this information, the ingress proximity predictor 501 may score each peering router $450_{1-N}$ that captured the packet based on the number of times the client device used the peering router to enter the network 430 to access the content portals $460_{1-N}$ or the content DNS server 480. The ingress proximity predictor 501 may then determine that the peering router most frequently used by the client to enter the network is in the nearest physical proximity to the client.

The presence collector 502 is configured to receive updates from various components in the content distribution network. For example, the various content caches, peering routers, and DNS servers may update the presence collector 502 with information regarding their present location, their network location, and the types of data they receive and transfer. The egress proximity selector 503 determines which content cache is nearest to the peering router identified by the ingress proximity predictor 501 as being nearest to the client. The egress proximity selector 503 may rank and score content caches based on static mappings, routing tables, physical distance, or any other method. Once the egress proximity selector 503 identifies the nearest content cache, the service routing engine 412 may cause future or current requests for content to be served by the identified content cache.

Advantageously, embodiments disclosed herein correlate the probability of an incoming client trajectory with a cache system's outgoing content delivery trajectory. The result is a path that is optimized topologically from both the network operator and client perspective. By predicting the client's nearest point of ingress as being the peering router that the client most frequently connects to, embodiments disclosed herein may serve content to the client through content caches nearest to the peering router that is the client's nearest point of ingress.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications content distribution systems or related data available in the cloud. For example, the service routing engine could execute on a computing system in the cloud and direct fulfillment of client requests. In such a case, the service routing engine could predict the client's nearest point of ingress and store the client's most current nearest point of ingress at a storage location in the cloud. Doing so allows a user to access this information from any computing system attached to a network connected to the cloud (e.g., the Internet).

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method, comprising:
    capturing, by at least one of a plurality of peering routers, parameters for each of a plurality of data packets sent by a client device and specifying a destination network address;
    determining that a subset of the plurality of peering routers captured the parameters for each of the plurality of data packets;
    determining, that a first peering router, of the subset of the plurality of peering routers, is nearest to the client device, relative to the other peering routers of the subset of the plurality of peering routers;
    determining, for each of the plurality of peering routers, a probability that a content request subsequently received from the client device will enter a content distribution network via the respective peering router;
    determining that the probability of the first peering router is greater than the probabilities of each of the other peering routers of the plurality of peering routers;
    determining that a first content cache, of a plurality of content caches in the content distribution network, is nearest to the first peering router; and
    responsive to receiving the content request from the client device, fulfilling the content request using: (i) content stored on the first content cache, and (ii) the first peering router.

2. The method of claim 1, wherein the destination network address comprises an Internet protocol (IP) address associated with, in respective instances, each of: (i) a content portal for the content distribution network, and (ii) a content domain name system (DNS) for the content distribution network.

3. The method of claim 1, wherein determining that the first peering router is nearest to the client device comprises determining that the first peering router captured more parameters for data packets than any other peering router, wherein determining that the probability of the first peering router is greater than the probabilities of each of the other peering routers of the plurality of peering routers is based on the determining that the first peering router captured more parameters for data packets than each of the other peering routers of the plurality of peering routers.

4. The method of claim 1, wherein the first content cache is determined to be nearest to the first peering router based on each of: (i) referencing a network proximity server, (ii) a physical distance between each content cache and each peering router, and (iii) a static mapping indicating a nearest peering router for each respective content cache.

5. The method of claim 1, wherein the client device is connected to a first network that is owned by an entity that does not own the content distribution network.

6. The method of claim 1, wherein each peering router provides a respective point of ingress and egress to the content distribution network.

7. The method of claim 1, further comprising:
    indexing the captured parameters for each of the plurality of data packets based on a respective source IP address of each respective data packet in a database, wherein the database is referenced to determine that the first peering router is nearest to the client.

8. A system, comprising:
    one or more computer processors; and
    a memory containing a program, which when executed by the one or more computer processors, performs an operation, the operation comprising:
        capturing, by at least one of a plurality of peering routers, parameters for each of a plurality of data packets sent by a client device and specifying a destination network address;
        determining that a subset of the plurality of peering routers captured the parameters for each of the plurality of data packets;
        determining, that a first peering router, of the subset of the plurality of peering routers, is nearest to the client device, relative to the other peering routers of the subset of the plurality of peering routers;
        determining, for each of the plurality of peering routers, a probability that a content request subsequently received from the client device will enter a content distribution network via the respective peering router;
        determining that the probability of the first peering router is greater than the probabilities of each of the other peering routers of the plurality of peering routers;
        determining that a first content cache, of a plurality of content caches in the content distribution network, is nearest to the first peering router; and
        responsive to receiving the content request from the client device, fulfilling the content request using: (i) content stored on the first content cache, and (ii) the first peering router.

9. The system of claim 8, wherein the destination network address comprises an Internet protocol (IP) address associated with, in respective instances, each of: (i) a content portal for the content distribution network, and (ii) a content domain name system (DNS) for the content distribution network.

10. The system of claim 8, wherein determining that the first peering router is nearest to the client device comprises determining that the first peering router captured more parameters for data packets than any other peering router, wherein determining that the probability of the first peering router is greater than the probabilities of each of the other peering routers of the plurality of peering routers is based on the determining that the first peering router captured more parameters for data packets than each of the other peering routers of the plurality of peering routers.

11. The system of claim 8, wherein the first content cache is determined to be nearest to the first peering router based on each of: (i) referencing a network proximity server, (ii) a physical distance between each content cache and each peering router, and (iii) a static mapping indicating a nearest peering router for each respective content cache.

12. The system of claim 8, wherein the client device is connected to a first network that is owned by an entity that does not own the content distribution network.

13. The system of claim 8, wherein each peering router provides a respective point of ingress and egress to the content distribution network.

14. The system of claim 8, the operation further comprising:
    indexing the captured parameters for each of the plurality of data packets based on a respective source IP address of each respective data packet in a database, wherein the database is referenced to determine that the first peering router is nearest to the client.

15. A computer program product, comprising:
    a non-transitory computer-readable storage medium having computer-readable program code embodied therewith, the computer-readable program code executable by a processor to perform an operation comprising:
        capturing, by at least one of a plurality of peering routers, parameters for each of a plurality of data packets sent by a client device and specifying a destination network address;
        determining that a subset of the plurality of peering routers captured the parameters for each of the plurality of data packets;
        determining, that a first peering router, of the subset of the plurality of peering routers, is nearest to the client device, relative to the other peering routers of the subset of the plurality of peering routers;
        determining, for each of the plurality of peering routers, a probability that a content request subsequently received from the client device will enter a content distribution network via the respective peering router;
        determining that the probability of the first peering router is greater than the probabilities of each of the other peering routers of the plurality of peering routers;
        determining that a first content cache, of a plurality of content caches in the content distribution network, is nearest to the first peering router; and
        responsive to receiving the content request from the client device, fulfilling the content request using: (i) content stored on the first content cache, and (ii) the first peering router.

16. The computer program product of claim 15, wherein the destination network address comprises an Internet protocol (IP) address associated with, in respective instances, each of: (i) a content portal for the content distribution network, and (ii) a content domain name system (DNS) for the content distribution network.

17. The computer program product of claim 15, wherein determining that the first peering router is nearest to the client device comprises determining that the first peering router captured more parameters for data packets than any other peering router, wherein determining that the probability of the first peering router is greater than the probabilities of each of the other peering routers of the plurality of peering routers is based on the determining that the first peering router captured more parameters for data packets than each of the other peering routers of the plurality of peering routers.

18. The computer program product of claim 15, wherein the first content cache is determined to be nearest to the first peering router based on each of: (i) referencing a network proximity server, (ii) a physical distance between each content cache and each peering router, and (iii) a static mapping indicating a nearest peering router for each respective content cache.

19. The computer program product of claim 15, wherein the client device is connected to a first network that is owned by an entity that does not own the content distribution network.

20. The computer program product of claim 15, wherein each peering router provides a respective point of ingress and egress to the content distribution network.

21. The computer program product of claim 15, the operation further comprising:
    indexing the captured parameters for each of the plurality of data packets based on a respective source IP address of each respective data packet in a database, wherein the database is referenced to determine that the first peering router is nearest to the client.

* * * * *